United States Patent [19]

Hayashi et al.

[11] 4,116,180
[45] Sep. 26, 1978

[54] INTERNAL COMBUSTION ENGINE WITH IMPROVED EXHAUST VALVE ARRANGEMENT

[75] Inventors: Yoshimasa Hayashi; Shin-ichi Nagumo, both of Yokohama, Japan

[73] Assignee: Nissan Motor Company, Limited, Yokohama, Japan

[21] Appl. No.: 765,771

[22] Filed: Feb. 4, 1977

[30] Foreign Application Priority Data

Feb. 6, 1976 [JP] Japan .................................. 51-11913

[51] Int. Cl.² ............................................. F02M 25/06
[52] U.S. Cl. .................................................. 123/119 A
[58] Field of Search .......... 123/119 A, 191 M, 191 R, 123/148 C, 148 DS, 90.27, 52 M, 59 R; 60/278, 323

[56] References Cited

U.S. PATENT DOCUMENTS

| | | | |
|---|---|---|---|
| 1,171,211 | 2/1916 | Keiper | 123/90.27 |
| 1,459,630 | 6/1923 | Spina | 123/90.27 |
| 1,722,145 | 7/1929 | Hermann | 123/119 A |
| 2,257,631 | 9/1941 | Wahlberg | 60/323 |
| 2,576,851 | 11/1951 | Angle | 123/41.69 |
| 3,164,143 | 1/1965 | Dolza | 123/90.27 |
| 3,219,019 | 11/1965 | Palmer | 123/90.27 |
| 3,885,535 | 5/1975 | Suter | 123/119 A |
| 3,901,203 | 8/1975 | Pozniak | 123/119 A |
| 3,945,365 | 3/1976 | Regueiro | 123/148 DS |
| 4,031,867 | 6/1977 | Yasuda et al. | 123/119 A |

FOREIGN PATENT DOCUMENTS 2,621,533 9/1976 Fed. Rep. of Germany ....... 123/148 C

*Primary Examiner*—Wendell E. Burns
*Attorney, Agent, or Firm*—Bacon & Thomas

[57] ABSTRACT

Exhaust gases, which are slightly cooler than normal due to NOx suppressing ignition of the charge containing a large amount of recirculated gas by dual spark plugs, are exhausted via a large diameter exhaust valve to reduce the time for which they exceed the speed of sound and transfer heat to the cylinder head to maintain a high CO and HC oxidizing temperature. The exhaust valve is diametrically opposed to the inlet valve and has a cross sectional area of 19 to 24% of the cylinder bore.

7 Claims, 5 Drawing Figures

INTERNAL COMBUSTION ENGINE WITH IMPROVED EXHAUST VALVE ARRANGEMENT

This invention relates to an internal combustion engine arranged to decrease the amount of unburned constituents contained in the exhaust gases by oxidizing the unburned constituents in the exhaust system of the engine.

In connection with controlling generation of nitrogen oxides (NOx) in each combustion chamber of an internal combustion engine, it has been proposed that a relatively large amount of the exhaust gases is recirculated into the combustion chamber and thereafter the charge containing the large amount of the exhaust gases is ignited by two spark plugs disposed within the combustion chamber thereby lowering the maximum temperature of the combustion carried out in the combustion chamber. NOx generation may be sufficiently suppressed by the thus arranged engines. However, the noxious unburned constituents such as carbon monoxide (CO) and hydrocarbons (HC) in the exhaust gases may not be decreased even by the such arranged engines and therefore these constituents must be oxidized in the exhaust system of the engine to convert them into innoxious compounds.

In order to promote the oxidation reaction carried out in the exhaust system, it is required to maintain the exhaust gas temperature as high as possible since the peak combustion temperature in the combustion chamber has been suppressed as described above. In this connection, the oxidation reaction of the unburned constituents in the exhaust system is promoted as the exhaust gas temperature is raised.

It is, therefore, the prime object of the present invention to provide an improved internal combustion engine capable of effectively removing the unburned constituents contained in the exhaust gases of the engine without any deterioration of the performance characteristics of the engine.

Another object of the present invention is to provide an improved internal combustion engine which can maintain the exhaust gas temperature sufficiently high to promote the oxidation reaction, carried out in the exhaust system of the engine, of the unburned constituents contained in the exhaust gases discharged from the combustion chamber of the engine.

A further object of the present invention is to provide an improved internal combustion engine in which the velocity of the exhaust gases passing between the exhaust valve and the valve seat is considerably lowered during the initial opening of the exhaust valve in order to decrease transfer of the exhaust heat to the cylinder head.

A still further object of the present invention is to provide an improved internal combustion engine in which the cross-sectional area defined by the outermost periphery of the exhaust valve is sufficiently large as to decrease the time within which exhaust gases flow at the velocity of sound betwween the exhaust valve and the valve seat during the initial opening of the exhaust valve.

Other object, features, advantages of the engine in accordance with the present invention will be more apparent from the following description of the preferred embodiment thereof taken in conjunction with the accompanying drawings, in which.

Figure 1:
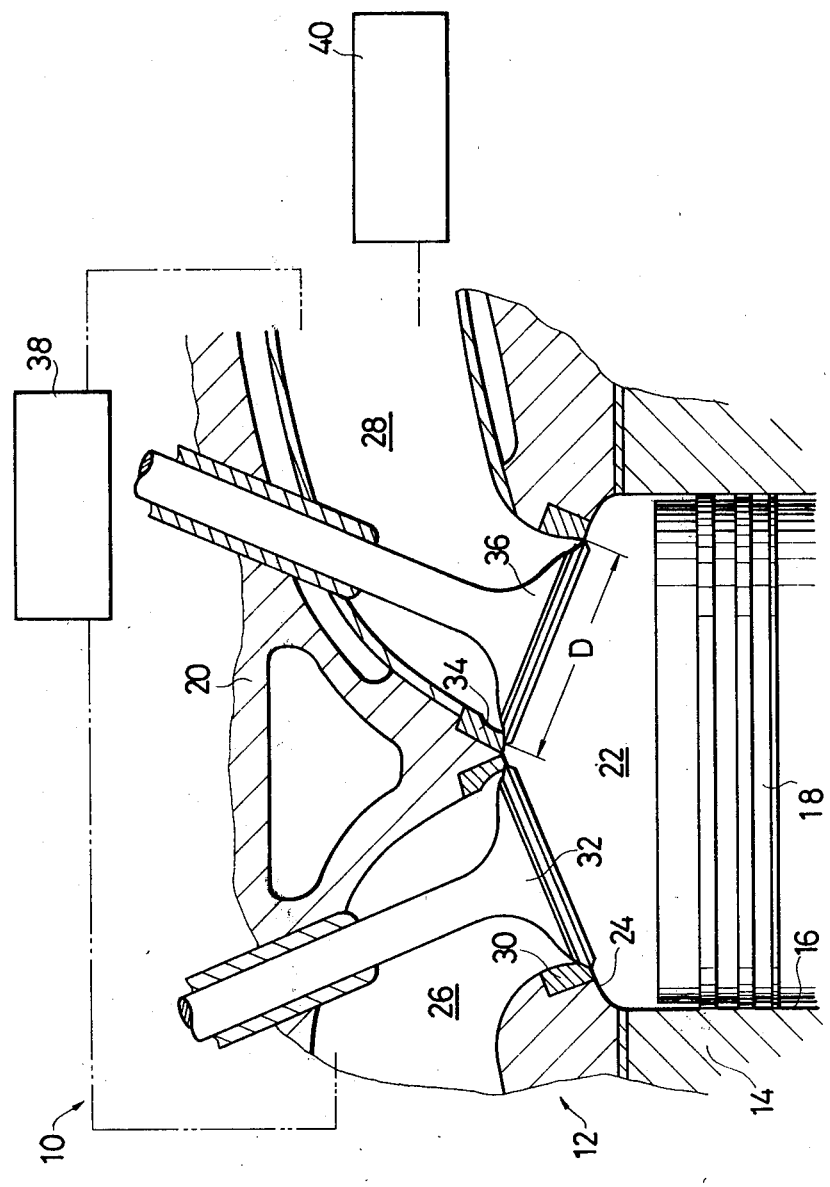
FIG. 1 is a vertical cross-sectional view of a preferred embodiment of an internal combustion engine in accordance with the present invention.
Figure 2:
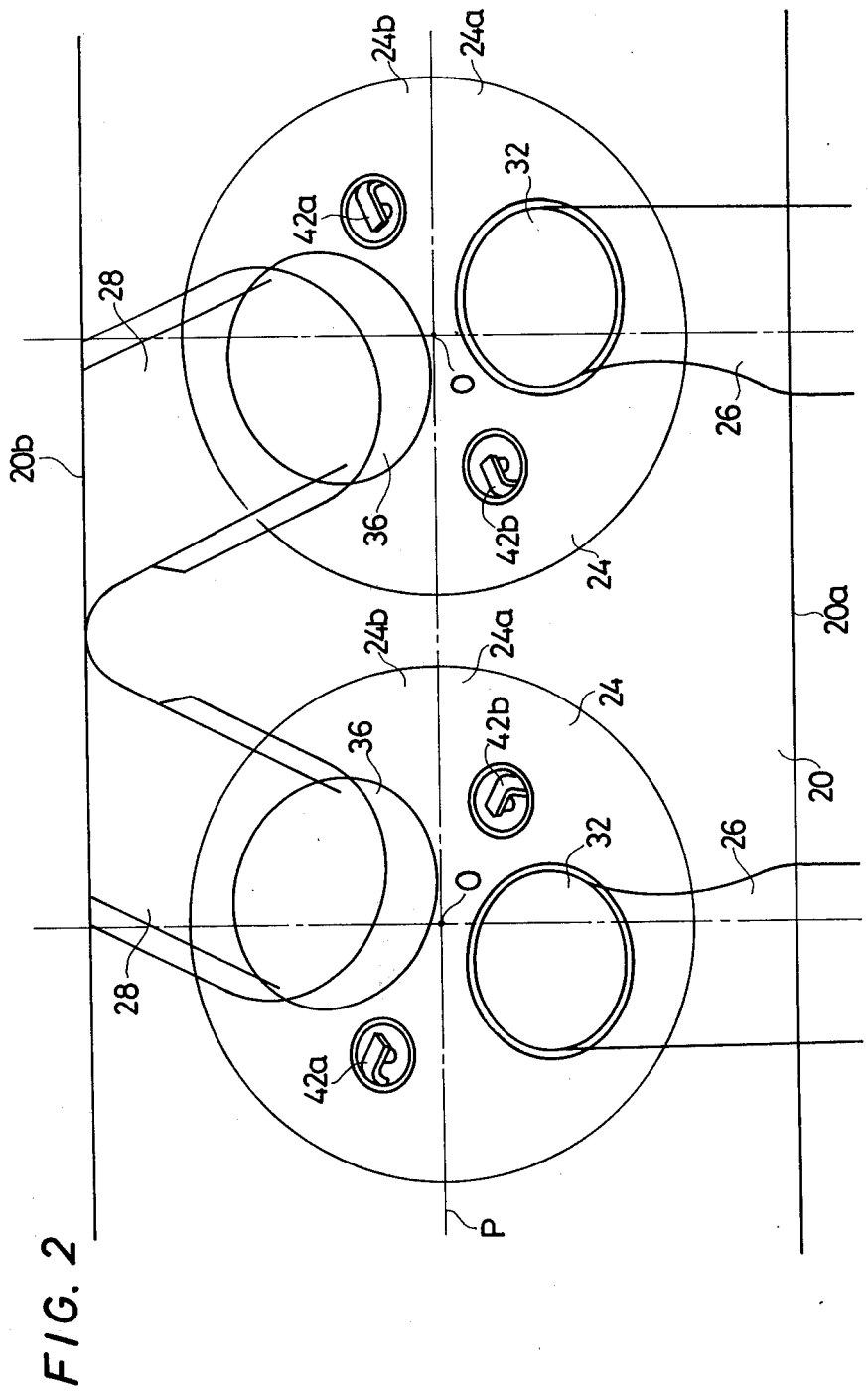
FIG. 2 is a plan view of the cylinder head of the engine of FIG. 1, showing an example of the intake and exhaust valves arrangement.

Referring now to FIGS. 1 and 2 of the drawings, a preferred embodiment of an internal combustion engine is shown and designated by the reference numeral 10. The engine 10 comprises an engine proper 12 which includes a cylinder block 14 defining therein cylinders within which pistons 18 are reciprocally disposed. Secured to the top portion of the cylinder block 14 is a cylinder head 20 which closes the one ends or upper ends of the cylinders to form combustion chambers 22 between recessed surface portions 24 of the cylinder head 20 and the crowns of the pistons 18.

As shown in FIG. 2 which is a plan view of the bottom portion of the cylinder head 20 as viewed from the direction of the piston 18, the cylinder head 20 is formed into an elongate shape having two parallel flat sides 20a and 20b and is formed with inlet ports 26 communicable with the combustion chambers 22 and exhaust ports 28 communicable with the combustion chambers 22. Movably disposed with each intake valve seat 30 formed in the surface portion 24 is an intake valve 32 which is arranged to block or establish the communication between each combustion chamber 22 and each intake port 26. Movably disposed with each exhaust valve seat 34 formed in the surface 24 is exhaust valve 36 which is arranged to block or establish the communication between each combustion chamber 22 and each exhaust port 28. As best seen in FIG. 2, the intake valve 32 is located at one side 24a of the surface portion 24 with respect to a vertical longitudinal plane P (only its cross-section shown) of the cylinder head 20 which plane P passes through the center axis O (only its cross-section shown) of the cylinder bore which center axis O passes the center (not identified) of the surface portion 24 of the cylinder head 20. On the contrary, the exhaust valve 36 is located at the other side 24b of the circular surface portion 24 or opposite to the one side 24a with respect to the vertical longitudinal plane P. These locations of the intake and exhaust valves 32 and 36 permit the increase of the diameter D of the exhaust valve 36. In order to allow further increase of the diameter D of the exhaust valve 36, the intake valve 32 and the exhaust valve 36 are located such that vertical planes (not shown), perpendicular to the vertical longitudinal plane P of the cylinder head, passing the centers (not shown) of the intake and exhaust valves 32 and 36 are separate from each other as shown in FIG. 2. Thus, the cross-sectional area defined by the outermost periphery or by the effective diameter D of the exhaust valve 36 is maximizable and therefore is set within the range from 19 to 24% of or is 0.19 to 0.24 times the cross-sectional area of the cylinder bore. In this case, the diameters of the cylinder bore, intake valve 32, and the exhaust valve 36 are designed to be 85mm, 38mm, and 38mm, respectively. As seen, this cylinder head 20 employs a so-called cross-flow induction-exhaust arrangement in which the intake ports 26 open to the one side 20a of the cylinder head 20 and the exhaust ports 28 open to the opposite side 20b of same for making possible larger ports and better breathing.

Connecting the intake port 26 and the exhaust port 28 is means 38 for recirculating a portion of the exhaust gases discharged from the combustion chamber 22 through the exhaust port 28 into the combustion chamber 22 through the intake port 26 in order to decrease generation of nitrogen oxides (NOx) in the combustion chamber. The exhaust gas recirculating means 38 is arranged to control the amount of the exhaust gases recirculated into the combustion chamber 22 within the range of from 20 to 40% by volume of the intake air inducted into the combustion chamber 22 through the intake port 26. The reference numeral 40 indicates means for oxidizing the unburned constituents such as carbon monoxide (CO) and hydrocarbons (HC) contained in the exhaust gases discharged from the combustion chamber 22 through the exhaust port 28, such as, for example, a reactor installed to the exhaust system of the engine 10. Two spark plugs 42a and 42b are disposed in each combustion chamber 22, as shown in FIG. 2, in such a manner that the two spark plugs are disposed in the cylinder head 20 and projected through the surface portion 24 into the combustion chamber 22. The two spark plugs 42a and 42b are located opposite with respect to the center axis O of the cylinder and considerably separated from each other in order to effectively ignite the charge containing a large amount of exhaust gases which are recirculated by the exhaust gas recirculating means 38.

The reasons why such an arrangement is preferable will be explained hereinafter.

The pressure in the combustion chamber 22 due to combusted gases is extremely high immediately before the exhaust valve opens to discharge the combusted gases or exhaust gases into the exhaust port 28. Accordingly, during the initial opening of exhaust valve 36, the velocity of the exhaust gases passing through the throat portion defined by the exhaust valve 36 and the valve seat 34 reaches the velocity of sound because of an extremely high pressure differential between the combustion chamber 22 and the exhaust port 28. It will be understood that, in general, transfer of the exhaust gas heat to the cylinder head 20 increases with the increase of the velocity of the exhaust gases and therefore the cooling rate of the exhaust gases is higher when the exhaust gases flow with the velocity of sound through the throat portion defined by the exhaust valve 36 and the valve seat 34. With this connection, in order to decrease the lowing of the temperature of the exhaust gases discharged from the combustion chamber 22, the time within which the exhaust gases flow at the velocity of sound through the above-mentioned throat portion should be as short as possible.

Now, the volume of the combustion chamber 22 is, as a matter of course, restricted to a certain value and therefore the time required for dropping or decreasing the pressure in the combustion chamber 22 is shortened with the increase of the opening area of the throat portion defined by the exhaust valve 36 and the valve seat 34. Consequently, if the pressure in the combustion chamber 22 is rapidly dropped within a short period of time, the time within which the exhaust gases flow at the velocity of sound is shortened. Experiments reveal that the exhaust gases flow at the velocity of sound when the exhaust valve begins to open. In view of the above, it is desirable to increase, as much as possible, the opening area of the throat portion defined by the exhaust valve 36 and the valve seat 34 during the initial opening of the exhaust valve 36 to prevent the cooling effect to the exhaust gases discharged from the combustion chamber through the exhaust port 28.

In this respect, the present invention contemplates to increase the opening area of the above-mentioned throat portion at the beginning of opening of the exhaust valve and decrease the time within which the exhaust gases flow in the velocity of sound through the above-mentioned throat portion by optimally maximising cross-sectional area defined by the outermost periphery of the exhaust valve 36, i.e. within the range from 19 to 24% of the cross-sectional area of the cylinder bore. In this connection, it is usual in conventional engines that the exhaust valves are smaller than their intake valves in cross-sectional areas defined by the outermost peripheries of the valves, in consideration of the improvement of volumetric efficiency of the engines and the interference or the interaction between the intake and exhaust valves. It will be understood that, also in the engine according to the present invention, the problems on the volumetric efficiency and on the interference between the intake and exhaust valves are solved.

The effects obtained by the arrangement according to the present invention will be explained with reference to FIGS. 3 and 4.

Figure 3:
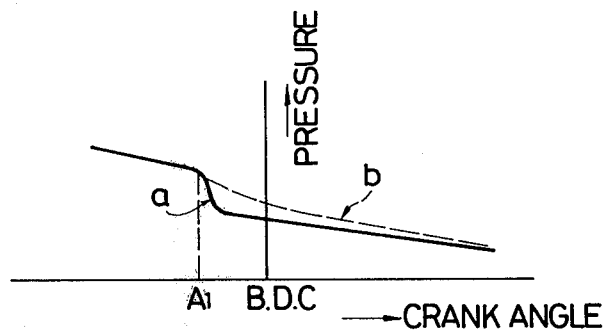
FIG. 3 is a graph showing the variations of the pressures in the combustion chambers of a prior art engine and an engine according to the invention.
Figure 4:
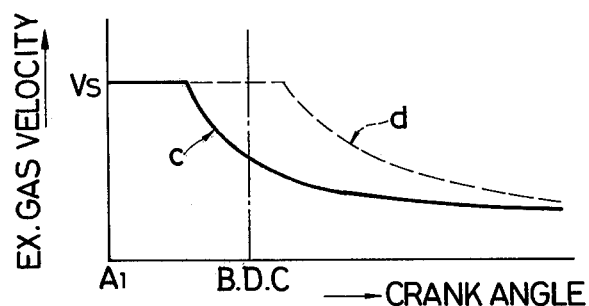
FIG. 4 is a graph showing the variations of the velocities of the exhaust gases passing between the exhaust valve and the valve seat of a prior art engine and an engine according to the invention.

FIG. 3 shows the variation of the pressure in the combustion chamber of the engine, in which a line $a$ represents the variation in an engine according to the present invention and a dotted line $b$ represents that in a conventional engine. As seen from the figure, the pressure in the combustion chamber of the engine according to the present invention abruptly drops immediately after the beginning or the initial point $A_1$ of opening of the exhaust valve 36 as compared with the conventional engine. This abrupt pressure drop shortens, as shown in FIG. 4, the time within which the exhaust gases flow with the velocity of sound Vs through the throad portion defined by the exhaust valve 36 and the valve seat 34, as compared with the conventional engine. In FIG. 4, a line $c$ represents the variation of the velocity of the exhaust gases passing through the above-mentioned throat portion by the engine according to the present invention, and a dotted line $d$ represents the same variation by the conventional engine.

As discussed above, according to the present invention, the time within which the exhaust gases flow at the velocity of sound is shortened and therefore the exhaust gas temperature drop may be greatly suppressed. By this suppressing the exhaust gas temperature drop, CO and HC contained in the exhaust gases may be effectively oxidized in the oxidizing means 40 such as the reactor installed to the exhaust system of the engine. Additionally, it will be understood that NOx emission level may be greatly decreased since NOx formation in the combustion chamber may be suppressed by recirculating a large amount of the exhaust gses into the combustion chamber.

With respect to the above-described range in which cross-sectional area defined by the outermost periphery of the exhaust valve 36 is within the range from 19 to 24% of the cross-sectional area of the cylinder bore, its upper and lower limits have been determined by the following reasons: when below the lower limit, the time within which the exhaust gases flow at the velocity of sound is too long and therefore the exhaust gases are excessively cooled down to a level at which effective oxidation of CO and HC is not sufficiently carried out. On the contrary, when above the higher limit, the performance characteristics of the engine are deteriorated due to the interaction between the intake and exhaust valves 32 and 36 and, by doing same, an improved exhaust gas temperature maintaining effect is not obtained.

Figure 5:
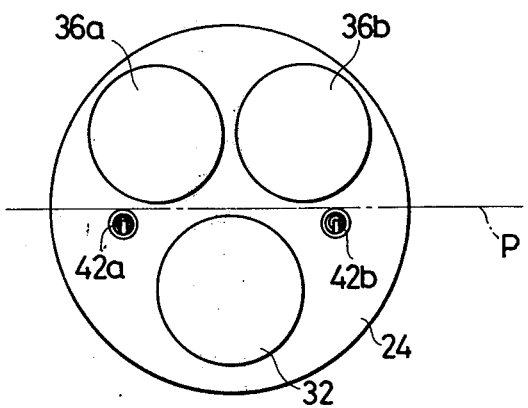
FIG. 5 is a plan view showing another example of the intake and exhaust valves arrangement of the engine according to the present invention.

FIG. 5 illustrates another example of the intake and exhaust valve arrangement according to the present invention, in which two exhaust valves 36a and 36b are located at the opposite side, in the surface portion 24 of the cylinder head, of the intake valve 32 with respect to the vertical longitudinal plane P of the cylinder head 20 in order to prevent the interaction between the intake and exhaust valves. In this case, the total cross-sectional area defined by the outermost peripheries of the two exhaust valves 36a and 36b is designed to be within the range from 19 to 24% of the cross-sectional area of the cylinder bore. Therefore, it will be understood that the same effects as the arrangement shown in FIGS. 1 and 2 may be obtained also by this intake and exhaust valve arrangement.

What is claimed is:

1. An internal combustion engine having a cylinder formed in a cylinder block, comprising:
   a cylinder head secured to the cylinder block to close the one end of the cylinder and form a combustion chamber between a recessed surface portion of the cylinder head and the crown of a piston reciprocally disposed within the cylinder, said cylinder head being formed with an intake port communicable with the combustion chamber and at least one exhaust port communicable with the combustion chamber;
   an intake valve movably disposed at the recessed surface portion of the cylinder head and arranged to block or establish the communication between the combustion chamber and the intake port, said intake valve being located on one side of the recessed surface portion with respect to a vertical longitudinal plane of the cylinder head, the vertical longitudinal plane passing through the center axis of the cylinder; and
   at least one exhaust valve movably disposed at the recessed surface portion of the cylinder head and arranged to block or establish the communication between the combustion chamber and the at least one exhaust port, said at least one exhaust valve being located on the other side of the recessed surface portion, opposite to said one side with respect to the longitudinal vertical plane of the cylinder head, the cross-sectional area defined by the outermost periphery of said at least one exhaust valve being 0.19 to 0.24 times the cross-sectional area of the cylinder bore.

2. An internal combustion engine as claimed in claim 1, further comprising means for oxidizing the unburned constituents contained in the exhaust gases discharged from the combustion chamber through said exhaust port.

3. In an internal combustion engine having a cylinder block forming therein a cylinder in which a piston is reciprocally disposed, a cylinder head secured to the cylinder block to close the one end of the cylinder and form a combustion chamber between a recessed surface portion of the cylinder head and the crown of the piston, said cylinder head being formed with an intake port communicable with the combustion chamber and at least one exhaust port communicable with the combustion chamber, means for recirculating a portion of the exhaust gases into the combustion chamber, and two spark plugs disposed within the combustion chamber to ignite a charge containing the exhaust gases, the improvement comprising;
   an intake valve movably disposed at the circular surface portion of the cylinder head and arranged to block or establish the communication between the combustion chamber and the intake port, said intake valve being located at one side of the recessed surface portion with respect to a vertical longitudinal plane of the cylinder, said longitudinal vertical plane passing through the center axis of the cylinder; and
   at least one exhaust valve movably disposed at the recessed surface portion of the cylinder head and arranged to block or establish the communication between the combustion chamber and the at least one exhaust port, said exhaust valve being located on the other side of the recessed surface portion, opposite to the one side with respect to the vertical longitudinal plane of the cylinder head, the cross-sectional area defined by the outermost periphery of said at least one exhaust valve being 0.19 to 0.24 times the cross-sectional area of the cylinder bore.

4. An internal combustion engine as claimed in claim 3, further comprising means for oxidizing the unburned constituents contained in the exhaust gases discharged from the combustion chamber through said exhaust port.

5. An internal combustion engine as claimed in claim 3, in which the exhaust gas recirculating means includes means for controlling the amount of the exhaust gases recirculated into the combustion chamber within the range, at maximum, from 20 to 40% by volume of the intake air inducted in the combustion chamber through the intake port.

6. An internal combustion engine as claimed in claim 3, said at least one exhaust valve includes two exhaust valves wherein the total cross-sectional area defined by the outermost peripheries of said two exhaust valves is 0.19 to 0.24 times the cross-sectional area of the cylinder bore.

7. An internal combustion engine as claimed in claim 3, in which said at least one exhaust valve and said intake valve is arranged such that the vertical planes, perpendicular to the vertical longitudinal plane of the cylinder head, passing through the centers of said intake and exhaust valves are separate from each other.

* * * * *